United States Patent [11] 3,596,002

[72] Inventors Horst Erstetten Ohnsorge;
Wolf Herold, both of Ay (Iller), Germany
[21] Appl. No. 869,053
[22] Filed Oct. 24, 1969
[45] Patented July 27, 1971
[73] Assignee Telefunken Patentverwertungsgesellschaft m.b.H.
Ulm Danube, Germany
[32] Priority Oct. 24, 1968
[33] Germany
[31] P 18 04 14.1

[54] SYSTEM FOR TRANSMITTING BINARY-CODED DATA
6 Claims, 3 Drawing Figs.

[52] U.S. Cl. .......... 179/15 BA, 178/68, 325/4
[51] Int. Cl. .......... H04j 7/02
[50] Field of Search .......... 343/100 ST; 325/4; 179/15 BS, 15 BA, 15 BC, 15 BY, 15 AD, 15 AP; 178/68

[56] References Cited
UNITED STATES PATENTS

| | | | |
|---|---|---|---|
| 3,204,035 | 8/1965 | Ballard | 178/68 X |
| 3,239,761 | 3/1966 | Goode | 179/15 X BA |
| 3,394,224 | 7/1968 | Helm | 179/15 X BC |
| 3,532,985 | 10/1970 | Glomb | 179/15 X BS |

*Primary Examiner*—Ralph D. Blakeslee
*Attorney*—Spencer & Kaye

ABSTRACT: A satellite link binary data transmission system including a plurality of ground stations capable of operating simultaneously, each station transmitting a cyclically repeated address code word and polarity modulating each such word according to the value of one data bit to be transmitted, the satellite being arranged to combine all transmitted signals into a composite signal and each station being arranged to receive the composite signal and to extract therefrom the data directed to it by correlating the composite signal with its own address word.

*Inventors.*
Horst Ohnsorge
Wolf Herold

BY Spencer & Kaye
ATTORNEYS

SYSTEM FOR TRANSMITTING BINARY-CODED DATA

BACKGROUND OF THE INVENTION

The present invention relates to a system for transmitting binary-coded data between ground stations through intermediary of one or a plurality of communications satellites.

Modern data transmission between ground stations via satellites permits due to the large bandwidth of such systems, the attainment of high data flow densities. Usually, such systems transmit the data in binary-coded form.

In order to fully utilize the transmission path, time multiplex systems are known which, however, exhibit the drawback that each user in the communications system must maintain his allocated time interval precisely within the established time frame. Thus transmission time is lost which must be used for synchronization and address transmission.

Use has also been made of data transmission systems employing time function multiplexing, such as Radas and SSMA, in which data is transmitted in cycles but where there is no longer a fixed allocation of time locations. Addresses are transmitted and are modulated, for example according to the delta modulation method or according to the pulse amplitude modulation method, with the data to be transmitted.

In Radas the transmitted addresses are relatively short and this might cause errors because of address overlapping.

In SSMA the transmitted addresses are relatively long and overlap to a large extent. The data intended for each individual user is extracted by correlating the composite signal with the address of the user. In this method the signal-to-noise ratio is relatively unfavorable.

SUMMARY OF THE INVENTION

It is a primary object of the present invention to provide a data transmission system which is free of above-mentioned drawbacks.

This is accomplished, according to the present invention, by the provision of a novel method for transmitting binary-coded data between ground stations via a communications satellite.

The method is carried out by causing all ground stations to operate simultaneously, each station transmitting or receiving at any given time, sending from each transmitting station a cyclic sequence of address words while modulating the polarity of each word in accordance with a single respective data bit to be transmitted, sending such sequences from all transmitting stations so that they arrive at the satellite with a fixed phase relationship to one another, combining all received sequences at the satellite into a composite signal, transmitting the composite signal from the satellite to all ground stations, and correlating the received composite signal at each ground station with the address word of that station for selecting the data intended for that station.

The objects according to the invention are also achieved by the provision of a system for transmitting binary-coded data between ground stations via a communications satellite.

The system essentially includes control means for causing all ground stations to operate simultaneously, each station transmitting or receiving at any given time, transmission control means at each station for sending from each transmitting station a cyclically repeated address word while modulating the polarity during each word cycle in accordance with a single respective data bit to be transmitted, synchronization means for causing such sequences from all transmitting stations to arrive at the satellite with a fixed phase relationship to one another, means at the satellite for combining all received sequences at the satellite into a composite signal, retransmission means for transmitting the composite signal from the satellite to all ground stations, and correlation means at each station for correlating the received composite signal at each ground station with the address word of that station for selecting the data intended for that station.

DESCRIPTION OF THE PREFERRED EMBODIMENTS

Figure 1:
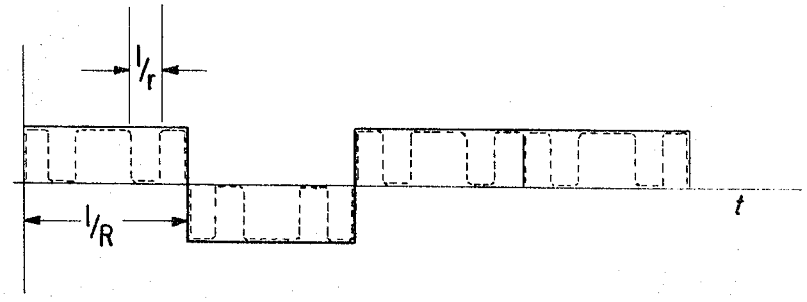
FIG. 1 is a signal diagram illustrating the principles of the present invention.

FIG. 1 shows a bit sequence for a single ground station which is polarity modulated by the binary data bit group LO LL (L being employed to represent the binary "1" state). The binary data bit rate is R bits per second. The actually transmitted bit sequence, shown in broken lines, is at a higher clock frequency $r$ and represents the station address word "LO LL OL" being transmitted during each individual bit period 1/R. The polarity of this bit sequence thus contains the data to be transmitted.

All ground stations transmit their data in this manner and they can all transmit or receive simultaneously. It is not necessary, however, that all ground stations transmit continuously. The modulated data signals transmitted from the individual ground stations are combined in the satellite into a composite signal which is then retransmitted by the satellite, possibly after being amplified. Each participating ground station then extracts the data intended for it from the composite signal by correlating its address word with this composite signal.

Such a correlation produces an autocorrelation function (ACF) as well as a crosscorrelation function (CCF). In this case, the ACF contains the data to be received and the CCF presents only noise. In order to maintain a suitable signal-to-noise ratio it is necessary to cause the ACF to reach a maximum and to keep the CCF as low as possible. This can be accomplished with accuracy when each station has an address which is an orthogonal function with respect to each other station address word.

For such mutually orthogonal functions the CCF with respect to the address function of a first station is:

$$I(t)=\int_0^T \sum_{i=2}^{\nu} f_i(\tau)\cdot f_1(t+\tau)d\tau=0$$

where $T$ is the instant at which the result is determined, $f_1(\tau)$ is the address function of the first station, $f_i(\tau)$ is the address function of each $i$-th station other than the first, there being a total of $\nu$ stations, $t$ is the time delay between address functions, and $I(t)$ is the crosscorrelation function. The autocorrelation function $I_1(t)$ for the first station for orthogonal functions is:

$$I_1(t)=\int_0^T f_1(\tau)\cdot f_1(t+\tau)d\tau.$$

At time $t=T$, $I_1(t)$ is a maximum.

Functions which are orthogonal with respect to one another lose their orthogonality even if they experience slight time shifts between one another so that the CCF then becomes greater than zero.

It is therefore advantageous to take care that all time functions arriving at the receiver of the satellite exhibit a fixed chronological relationship with respect to one another. This fixed relationship is made more difficult by the different transit times for the signals from the ground stations to the satellite. This problem is solved by having each ground station monitor the composite signal and shift the data it transmits with respect to time to such an extent that orthogonality is assured.

Figure 2:
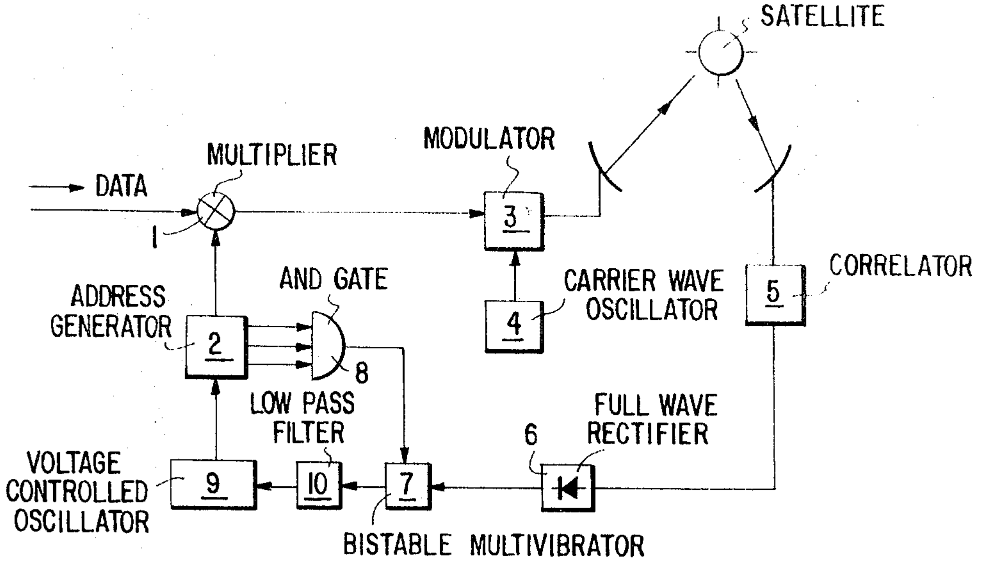
FIG. 2 is a block diagram of one subsystem of a ground station in the system according to the invention.

FIG. 2 shows the block circuit diagram of such a synchronizing system, for one ground station participating in the system according to the invention, for generating and synchronizing the bit frequency.

The data to be transmitted, i.e. the sequence of bits, are multiplied each by a complete address in a multiplicator 1. The addresses are delivered by an address generator 2 which is e.g. a feedback-shift register controlled as described infra. The addresses multiplied by the data modulate a carrier (modulator 3, carrier oscillator 4) and are then transmitted to the satellite.

The receiving part of the ground station is built up as series connection of a correlator 5 (as described e.g. in Blasbalg, IEEE Trans., Vol AES 4, No. 5, Sept. 68, p. 774) and a full-wave-rectifier 6. The correlator 5 delivers a sequence of (+1, −1)-bits; the rectifier 6 alters this sequence into a sequence of (+1, +1)-bits. Each one of the latter bits flips a bistable multivibrator 7 into position 1. The multivibrator 7 is reset to position 0 by the output of an AND-gate 8, which delivers an impulse at the moment when the address generator 2 has delivered the half of one address. Thus the multivibrator 7 delivers a sequence of (0,1)-pulses whose DC-component (i.e. whose surface integral) is determined by he phase-difference between the addresses and the clock pulse derived from the received data. The least mentioned sequence controls a voltage controlled oscillator 9 after having passed through a low pass filter 10. The output pulses of oscillator 9 are used as the clock pulse controlling the address generator 2.

Figure 3:
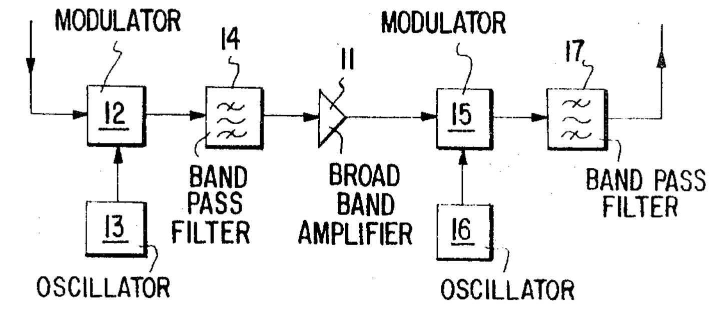
FIG. 3 is a block diagram of a satellite-borne receiving and retransmission circuit.

The satellite-borne receiving and transmission circuit is in principle an amplifier; FIG. 3 shows the broad band amplifier 11 and a modulator 12 beating the received carrier frequent data against the frequency of a first oscillator 13 and a first band-pass filter 14 which are connected to the input and a second modulator 15 beating the amplified data with the frequency of a second oscillator 16 and a second band-pass filter 17 connected to the output of the amplifier 11.

If a plurality of ground stations participate in the signal traffic, which stations might not be transmitting, under certain circumstances, for extended periods of time, it is advantageous to provide at least one "master station," i.e. one ground station which continuously transmits all of the addresses. These addresses can then be used for the above-mentioned synchronization.

Such a master station is quite generally of advantage because it helps to facilitate the synchronization of all ground stations inasmuch as there is always available a fixed reference clock pulse.

The master station differs from the ground station shown in FIG. 3 insofar as the control loop (elements 5, 6, 7, 8, 9, 10) is not necessary; instead of this, a quartz controlled oscillator 16 (FIG. 3) is used for controlling the address generator 2.

If there is provided a master station, the correlator 5 of each ground station advantageously is deriving a clock pulse from the addresses which transmitted by the master station.

As already described, the system according to the present invention can be operated particularly advantageously when orthogonal address functions are used. These differ from nonorthogonal functions, as already mentioned, only by their more favorable signal-to-noise ratio. Therefore, in principle, other functions are also suitable.

It is moreover possible to select from among the orthogonal functions, e.g. with the aid of an electronic computer, those functions which will, when they experience slight time shifts with respect to one another, as might occur due to small unavoidable synchronizing errors between the ground stations, cause the crosscorrelation function CCF to increase only very slightly, so that the data transmission operation becomes less sensitive to such errors and their consequent interferences.

An example for orthogonal functions of this type are the following eight addresses:

| | | | | | | | | |
|---|---|---|---|---|---|---|---|---|
| 1. ----- | 1 | 1 | 1 | 1 | 1 | 0 | 1 | 1 |
| 2. ----- | 1 | 1 | 1 | 0 | 0 | 0 | 0 | 0 |
| 3. ----- | 1 | 1 | 0 | 1 | 1 | 1 | 0 | 0 |
| 4. ----- | 1 | 1 | 0 | 0 | 0 | 1 | 1 | 1 |
| 5. ----- | 1 | 0 | 1 | 1 | 0 | 1 | 0 | 1 |
| 6. ----- | 1 | 0 | 1 | 0 | 1 | 1 | 1 | 0 |
| 7. ----- | 1 | 0 | 0 | 1 | 0 | 0 | 1 | 0 |
| 8. ----- | 1 | 0 | 0 | 0 | 1 | 0 | 0 | 1 |

It will be understood that the above description of the present invention is susceptible to various modifications, changes and adaptations, and the same are intended to be comprehended within the meaning and range of equivalents of the appended claims.

We claim:

1. A method for transmitting binary-coded data between ground stations via a communications satellite comprising the steps of:

a. causing all ground stations to operate simultaneously, each station transmitting or receiving at any given time;

b. sending from each transmitting station a cyclically repeated address word while modulating the polarity during each word cycle in accordance with a single respective data bit to be transmitted;

c. sending such sequences from all transmitting stations so that they arrive at the satellite with a fixed phase relationship to one another;

d. combining all received sequences at the satellite into a composite signal;

e. transmitting the composite signal from the satellite to all ground stations; and f. correlating the received composite signal at each ground station with the address word of that station for selecting the data intended for that station.

2. A system for transmitting binary-coded data between ground stations via a communications satellite, comprising in combination control means for:

a. causing all ground stations to operate simultaneously, each station transmitting or receiving at any given time;

b. transmission control means at each station for sending from each transmitting station a cyclically repeated address word while modulating the polarity during each word cycle in accordance with a single respective data bit to be transmitted;

c. synchronization means for causing such sequences from all transmitting stations to arrive at the satellite with a fixed phase relationship to one another;

d. means at the satellite for combining all received sequences into a composite signal;

e. retransmission means for transmitting the composite signal from the satellite to all ground stations; and f. correlator means at each station for correlating the received composite signal at the station with the address word of that station for selecting the data intended for that station.

3. An arrangement as defined in claim 2 wherein the address word for each station is an orthogonal time function with respect to the address word for every other station.

4. An arrangement as defined in claim 3 wherein the address word time functions selected are such that the ratio of the autocorrelation function to the cross correlation function for each word varies only slightly when there occur deviations from the fixed time relationship between address words.

5. An arrangement as defined in claim 2 wherein there is provided at least one continuously transmitting ground station.

6. An arrangement as defined in claim 5 wherein the other ground stations derive a reference clock pulse from the signal transmitted by the continuously transmitting ground station.

UNITED STATES PATENT OFFICE
CERTIFICATE OF CORRECTION

Patent No. 3,596,002 Dated July 27th, 1971

Inventor(s) Horst Ohnsorge and Wolf Herold

It is certified that error appears in the above-identified patent and that said Letters Patent are hereby corrected as shown below:

In the heading of the patent, lines 1 and 2, change "Horst Erstetten Ohnsorge; Wolf Herold, both of Ay(Iller), Germany" to --Horst Ohnsorge of Erstetten, Germany; Wolf Herold of Ay(Iller), Germany--; line 11, change "P 18 04 14.1" to --P 18 04 814.1--. Column 2, line 36, after "address" insert --word--. Column 3, line 19, change "he" to --the--.

Signed and sealed this 21st day of March 1972.

(SEAL)
Attest:

EDWARD M.FLETCHER,JR.
Attesting Officer

ROBERT GOTTSCHALK
Commissioner of Patents